United States Patent [19]

Tentij

[11] Patent Number: 4,765,966
[45] Date of Patent: Aug. 23, 1988

[54] SUBLIMATION APPARATUS

[75] Inventor: Martin Tentij, Almelo, Netherlands

[73] Assignee: Ultra-Centrifuge Nederland N.V., Almelo, Netherlands

[21] Appl. No.: 10,004

[22] Filed: Feb. 2, 1987

[30] Foreign Application Priority Data

Feb. 3, 1986 [NL] Netherlands ................ 8600258

[51] Int. Cl.[4] ............................................. B01D 7/00
[52] U.S. Cl. ...................................... 422/244; 55/82; 62/12; 165/61; 23/294 R
[58] Field of Search ............... 422/244; 55/82; 165/2, 165/61, 911, 912, 913; 23/294 R; 62/12

[56] References Cited

U.S. PATENT DOCUMENTS

| 2,855,281 | 10/1958 | Schmidt et al. | 422/244 |
| 3,005,691 | 10/1961 | Griffiths | 23/294 R |
| 4,055,397 | 10/1977 | Geradus van Heel | 23/294 R |
| 4,252,772 | 2/1981 | Way | 422/244 |

FOREIGN PATENT DOCUMENTS 916882  1/1963  United Kingdom .................... 55/82

Primary Examiner—Benoit Castel
Attorney, Agent, or Firm—Cushman, Darby & Cushman

[57] ABSTRACT

A sublimation apparatus comprising an inner vessel placed within an outer vessel leaving an interspace between them. Inlets and outlets for a gas to be treated are connected to the inner vessel. Plurality of parallel-connected heat exchange channels are provided around the inner vessel, which heat exchange channels are connected to a bottom header and to a top header. A heat exchanger is placed in the top header. The apparatus further has a first reservoir for a first heat exchange medium. A closable connecting duct connects the bottom header and the first reservoir, and another connecting duct connects a vapor space of the first reservoir and the top header. A second reservoir for a second heat exchange medium different from the first heat exchange medium is connected by a closable connecting duct to the interspace between the inner and outer vessels. A closable connecting duct connects a vapor space of the second reservoir with the top portion of the interspace. The second reservoir is provided with a heating element.

8 Claims, 2 Drawing Sheets

SUBLIMATION APPARATUS

BACKGROUND OF THE INVENTION

This invention relates to a sublimation apparatus that is to say, an apparatus for causing a gas to precipitate in the solid form and thereafter causing the gas precipitated in the solid form to sublime.

In this specification and in the appended claims, subliming only means passing directly from the solid phase into the gaseous phase.

The invention relates more particularly to an apparatus for causing a gas to precipitate in the solid form by cooling and thereafter causing the gas precipitated in the solid form to sublime by heating, comprising a vessel provided with inlet and outlet means for the supply and removal of the gas to be treated, cooling means for cooling the gas in said vessel and causing it to precipitate in the solid form, and heating means for causing the gas precipitated in the solid form in the vessel to sublime.

SUMMARY OF THE INVENTION

It is an object of the invention to improve prior apparatus of this kind in such a manner that the vessel can be very uniformly cooled and very uniformly heated, by virtue of which, at the worst, minute differences in temperature can arise throughout the entire vessel.

For this purpose the apparatus according to the invention is characterized in that the apparatus comprises an inner vessel placed within an outer vessel leaving an interspace between them, said inlet and outlet means for the gas to be treated being connected to said inner vessel, a relatively large number of parallel-connected heat exchange channels around said inner vessel, said channels being connected to a bottom and a top header, a heat exchanger arranged in said top header, a first reservoir for a first heat exchanger medium, a closable connecting duct between said bottom header and said first reservoir, a connecting duct between the vapour space of said first reservoir and said top header, a second reservoir for a second heat exchange medium different from said first heat exchange medium, a closable connecting duct between said interspace and said second reservoir, a closable connecting duct between the vapour space of said second reservoir and the top portion of said interspace, and a heating element in said second reservoir.

This apparatus makes it possible for the inner vessel to be cooled and heated substantially by means of cold or heat generated during phase transitions of the heat exchange mediums used.

The apparatus according to the invention is very suitable for use in switching from a continuous process to a batch process. In separating uranium isotopes by ultracentrifuges, for example, the ultimate product, uranium hexafluoride of the desired isotope is continuously produced at a very low pressure. The use of the apparatus according to this invention permits collecting this uranium hexafluoride product and transporting it further at a higher pressure.

BRIEF DESCRIPTION OF THE DRAWINGS

The apparatus according to the invention will now be described with reference to the accompanying drawings, which show one embodiment of the apparatus by way of example.

DESCRIPTION OF THE PREFERRED EMBODIMENTS

Figure 1:
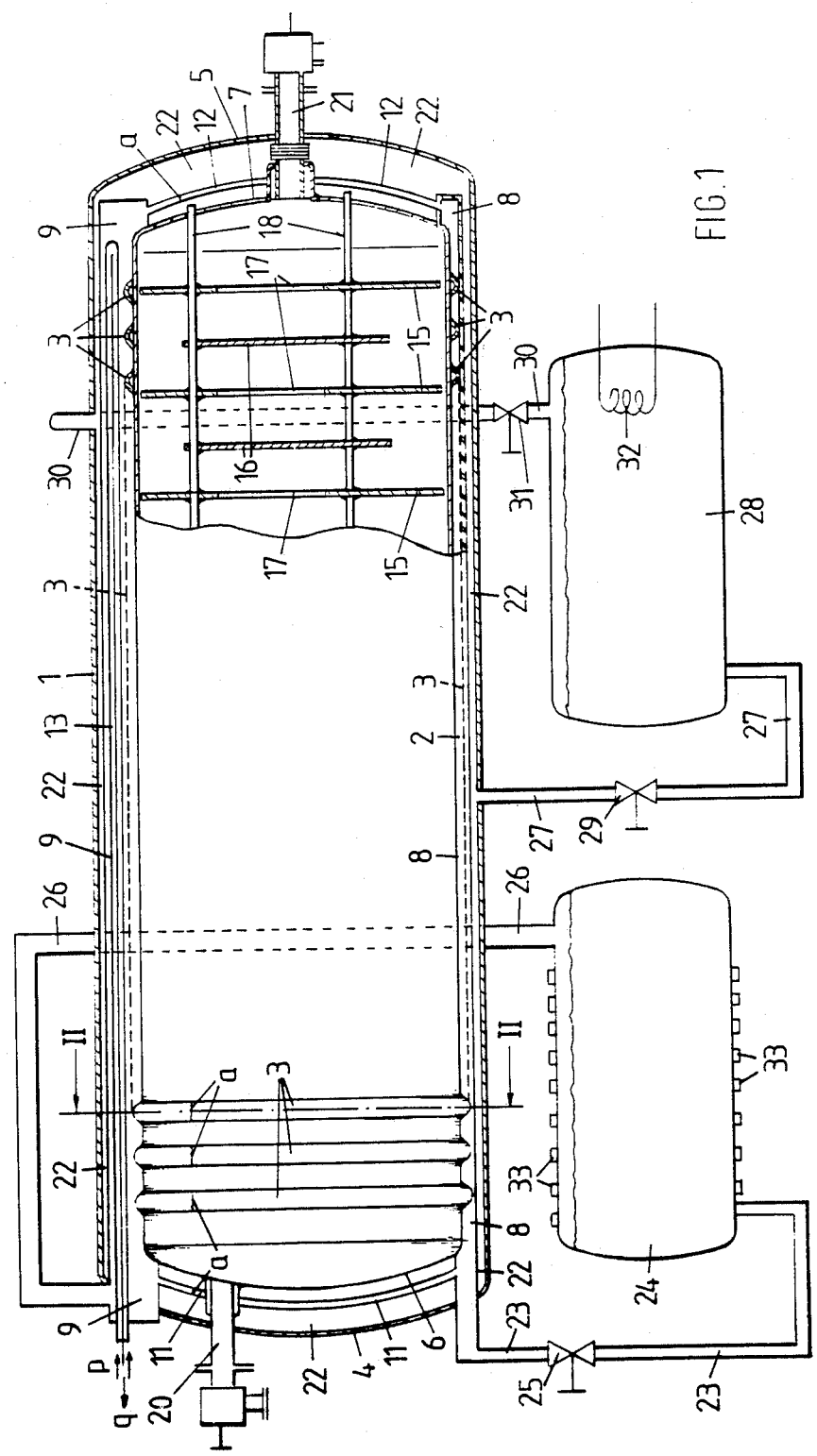
FIG. 1 shows a side elevational view of a longitudinal section of the apparatus.
Figure 2:
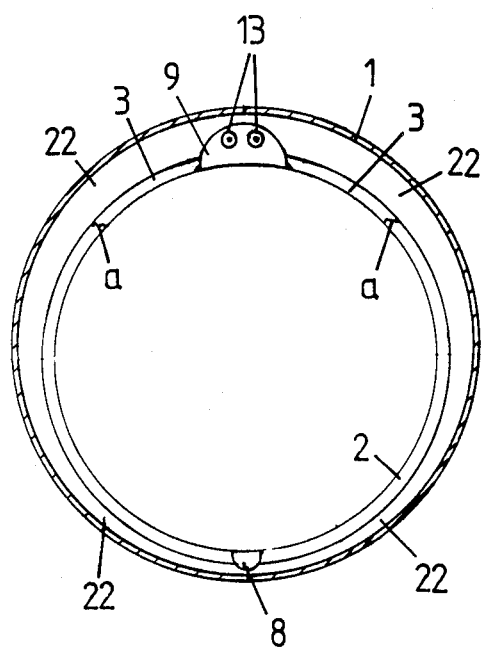
FIG. 2 shows a side-elevational view of a cross-section II—II of the same apparatus.

Housed within an elongate cylindrical outer vessel 1 is an elongate cylindrical inner vessel 2. The two vessels 1 and 2 are arranged so that their central longitudinal axes are horizontal and parallel to each other. The central longitudinal axis of the inner vessel 2 is placed slightly lower than the central longitudinal axis of the outer vessel 1. Accordingly, inner vessel 2 is placed somewhat eccentrically in outer vessel 1. Outer vessel 1 is closed at both ends by respective covers 4 and 5 and inner vessel 2 is closed at both ends by respective covers 6 and 7.

The outside of inner vessel 2 is provided with a large number of heat exchange channels 3, which are parallel to each other and surround inner vessel 2 virtually entirely. Channels 3 are uniformly distributed over the cylindrical outside of inner vessel 2.

Channels 3 are connected at the bottom to a bottom header 8 and channels 3 are connected at the top to a top header 9. Bottom header 8 extends at least throughout the entire length of inner vessel 2 and top header 9 also extends at least throughout the entire length of inner vessel 2. Channels 3 accordingly interconnect the bottom header 8 and the top header 9. Headers 8 and 9 are in addition interconnected by connecting ducts 11 and 12 respectively arranged adjacent the two ends of vessels 1 and 2.

Placed in the top header 9 is a heat exchanger 13, which may consist of more than one unit.

Mounted in inner vessel 2, adjacent cover 7, are a plurality of plates 15, which alternate with plates 16. Plates 15 are each provided with a central aperture 17 and extend to locations which are close to the cylindrical wall of inner vessel 2. Plates 16 terminate at a rather large distance from the cylindrical wall of inner vessel 2. Plates 15 and 16 are suspended from a plurality of axial rods 18.

Secured to the cover 6 of the inner vessel 2 is a conduit 20 for passing gases into or out of the inner vessel 2 a conduit for the supply and removal of gases to be treated. Secured at the upper cover 7 of inner vessel 2 is an outlet 21 for gases, so as to produce a connection with the interior of inner vessel 2.

Between outer vessel 1 and inner vessel 2, there is an interspace 22, which fully surrounds inner vessel 2.

The bottom header 8 is connected through a duct 23 to a first reservoir 24 for heat exchange medium, which duct 23 is provided with a valve 25. The top portion of reservoir 24 is connected through a duct 26 to header 9.

The bottom portion of interspace 22 is connected through a duct 27 to a second reservoir 28 for a heat exchange medium. Duct 27 is provided with a valve 29. The top of reservoir 28 is connected through a duct 30 to the top of interspace 22. Duct 30 is provided with a valve 31. Provided in reservoir 28 is a heating element 32, for example our electrical heating element.

There will now follow a description of the operation of the apparatus described.

There will first be treated a cooling phase, in which inner vessel 2 is cooled to a desired minimum temperature $t_1$; a transition phase, in which inner vessel 2 is heated from said temperature $t_1$ to a desired intermediate temperature $t_2$; and a heating phase, in which the inner vessel is heated to a desired maximum temperature $t_3$.

The cooling phase: During the cooling phase, valves 25, 29 and 31 are closed, and the lower header 8, heat exchange channels 3, connecting ducts 11 and 12 and the upper header 9 are filled with a given heat exchange medium, for example, freon R13/R503. For the sake of simplicity, the heat exchange medium will herein after be referred to as freon R13/R503. The bottom header 8 is entirely filled with freon R13/R503 in the liquid state and heat exchange channels 3 and connecting ducts 11 and 12 are filled as to about three-fourths with freon R13/R503 in the liquid state, the liquid level in connecting ducts 11 and 12 and in several heat exchange channels 3 being designated by a. It is noted, however, that in all heat exchange channels 3 the liquid extends to the same level a.

If gas is now supplied to the interior of inner vessel 2, said gas will give off heat to the liquid freon R13/R503 present in the heat exchange channels 3 and in the bottom header 8. As a consequence, vapour bubbles will be formed within the liquid freon R13/R503, which will rise in the liquid freon R13/R503. The vapour formed ultimately finds its way into the top header 9, in which heat exchanger 13 is provided. Heat exchanger 13 is cooled by a cooling medium, for example, liquid nitrogen, which is supplied at arrow p and removed in the gaseous state at arrow q. As a result, the evaporated freon R13/R503 will be condensed in top header 9 and precipitate in the liquid state on heat exchanger 13. The condensed freon R13/R503 then flows partly through ducts 11 and 12 back to bottom header 8 and ultimately again finds its way into heat exchange channels 3. Another part of the condensed freon R13/R503 flows directly into heat exchange channels 3. If desired, a horizontal partition (not shown in the drawings) may be provided under, and throughout the entire length of, heat exchanger 13, to ensure that the major portion of the condensed freon R13/R503 flows through connecting ducts 11 and 12 to the bottom header 8. It is noted that heat exchange channels 3, bottom header 8 and connecting ducts 11 and 12 form a system of communicating vessels.

This process of cooling by evaporation and condensation of the freon R13/R503 is continuously repeated, as a result of which the gas supplied to the interior of inner vessel 2 is cooled. As a result of this cooling, a portion of the gas in inner vessel 2 is precipitated in solid form on the inner surface of the cylindrical wall of inner vessel 2. Another part of the gas in the interior of inner vessel 2, namely, the part of the gas that cannot be precipitated at the prevailing temperatures, is directly removed in the gaseous state from inner vessel 2 by means of a vacuum pump (not shown in the drawings) connected to outlet 21.

As, below liquid level a, the cylindrical wall of inner vessel 2 is cooled by the evaporation of the liquid freon R13/R503 below liquid level a, a highly uniform cooling of the inner surface of the cylindrical wall of inner vessel 2 is achieved. As a result of this highly uniform cooling, it is achieved that the gas precipitated in the solid form is uniformly deposited on the inner surface of the cylindrical wall of the inner vessel 2. This deposition extends approximately up to liquid level a and extends as a layer of approximately constant thickness along the inner surface of the cylindrical wall of inner vessel 2. As a result, the passage for the gas being supplied to inner vessel 2 cannot be blocked by this deposition. When freon R13/R503 is used as the heat exchange medium, a temperature of about $-80°$ C. can be reached as the desired lowest temperature $t_1$ of inner vessel 2.

The transition phase: Heat exchanger 13 is switched off and valve 25 is opened to cause the liquid heat exchange medium, in this case the freon R13/R503, to flow from heat exchange channels 3, connecting ducts 11 and 12 and bottom header 8 through duct 23 to the first reservoir 24. Reservoir 24 is provided on its outside with fins 33, so that ambient heat can readily flow to the contents of reservoir 24.

Owing to the ingress of ambient heat to the liquid freon R13/R503 in reservoir 24, this will be evaporated. The vapour formed flows through duct 26 to top header 9 and thence to heat exchange channels 3 surrounding inner vessel 2, in which the vapour is condensed and hence releases heat. The condensate flows through space 8 and duct 23 back to reservoir 24. This process is continued until the temperature of inner vessel 2 is equal to that of reservoir 24, which ultimately has reached ambient temperature. This is the above intermediate temperature $t_2$.

The heating phase: The second reservoir 28 contains a heat exchange medium different from the heat exchange medium in reservoir 24. The heat exchange medium in reservoir 28 is, for example, freon R11, which is contained in the reservoir 28 in the liquid state. Valves 29 and 31 are opened and by means of heating element 32 heat is supplied to the liquid freon R11 in reservoir 28, as a result of which this is evaporated. The vapour formed flows through duct 30 to the interspace 22 between outer vessel 1 and inner vessel 2. The vapour is now condensed on the outer surface of inner vessel 2, as a result of which inner vessel 2 is heated. The condensate formed flows through duct 27 back to reservoir 28. This process is continued until inner vessel 2 has reached the desired final temperature $t_3$, which for example has a value of $+80°$ C.

After the completion of the above heating phase, the cooling phase, described hereinbefore, can be recommenced. For this purpose heating element 32 is switched off and valves 29, 31 and 25 are closed; also heat exchanger 13 is switched back on. The liquid freon R13/R503 in reservoir 24 will be evaporated owing to the ingress of ambient heat, and through duct 26 the vapour formed will flow to top header 9. Within header 9, the freon vapour will be condensed on heat exchanger 13 and the condensate formed will flow into connecting ducts 11 and 12, heat exchange channels 3 and bottom header 8, until the above liquid level a is again reached. The cooling phase, already described in detail, can then begin again.

During the cooling phase, a gas mixture is supplied to inner vessel 2 through inlet 20, which is largely precipitated in the solid form on the inner surface of the cylindrical wall of inner vessel 2. A portion of the gas supplied remains in the gaseous form and is removed by means of a pumping system connected to outlet 21. By virtue of the system of plates 15 and 16 adjacent to outlet 21 of inner vessel 2, this inner vessel is optically closed, that is to say, gas passed through inlet 20 into inner vessel 2 cannot flow direct to outlet 21. On the contrary, the gas is forced by the system of plates 15 and 16 to move along the cold wall of inner vessel 2, so that as much condensable gas can be precipitated on that cold wall as possible.

During the transitional phase and during the heating phase, the gas precipitated in the solid form on the inner surface of inner vessel 2 sublimes (evaporates). Outlet 21 is then closed and the gas formed leaves inner vessel 2 through inlet and outlet 20.

An important advantage of the apparatus described is that the wall of inner vessel 2 is always cooled and heated by a phase transition of the heat exchange medium, namely, evaporation of the medium in the cooling phase and condensation of the medium in the transitional phase and in the heating phase. As a consequence, a highly uniform cooling and heating of at least the entire cylindrical part of the wall of inner vessel 2 are obtained. This means that, at the worst, there will be very minute temperature differences throughout the entire inner vessel during normal operation. As a result, the occurrence of major temperature stresses in the apparatus will be prevented. It will also be prevented thereby that during the heating gas deposited in the solid form at a particular point in inner vessel 2 will sublime and then re-deposit in the solid form at a different point in inner vessel 2.

Another advantage of the apparatus described is that no transmission pumps and compressors are needed for the transportation of heat exchange medium in the cooling and heating system, which results in a saving of energy.

It is also an advantage of the apparatus described that during the cooling phase the interspace 22 between inner vessel 2 and outer vessel 1 is filled with heat exchange medium in the gaseous state; in the embodiment described gaseous freon R11 at a pressure of 50 Pa and a temperature of −80° C. As freon R11 is a heavy gas, by means of the interspace 22 thus filled an excellent heat insulation of inner vessel relative to its surroundings is accomplished. If desired, the outside of outer vessel 1 can of course be covered with heat-insulating material.

The heat exchange channels 3 consist of semicylindrical tubes welded to the outer surface of the cylindrical part of the wall of inner vessel 2. The bottom header 8 and the top header 9 also consist of semi-cylindrical tubes welded to the outside of the cylindrical part of the wall of inner vessel 2. It is noted that other forms are also possible.

The apparatus should be made of suitable metals or metal alloys resistant to the prevailing operating conditions.

I claim:

1. Apparatus for causing a gas to precipitate in a solid form by cooling and thereafter causing the gas precipitated in the solid form to sublime by heating, comprising: an inner vessel, where precipitation and sublimation occur, placed within an outer vessel leaving an interspace between them, said interspace having top and bottom portions; a conduit connected to said inner vessel for the supply and removal of a gas to be treated; a plurality of parallel-connected heat exchange channels around said inner vessel, said channels being connected to a bottom header below said inner vessel and a top header above said inner vessel; a heat exchanger for cold heat-exchange fluid arranged in said top header; a first reservoir for a vaporizable first heat exchange medium, said first reservoir having an internal upper space which in operation of the apparatus forms a vapor space, a connecting duct including a closable valve between said bottom header and said first reservoir; a connecting duct between the said upper space of said first reservoir and said top header; a second reservoir for a vaporizable second heat exchange medium different from said first heat exchange medium, said second reservoir having an internal upper space which in operation of the apparatus forms a vapor space; a connecting duct including a closable valve between said interspace and said second reservoir; a connecting duct including a closable valve between said upper space of said second reservoir and the top portion of said interspace; and a heating element in said second reservoir.

2. Apparatus as in claim 1 wherein said bottom header is disposed in said interspace.

3. Apparatus as in claim 1 wherein the top header is disposed in said interspace.

4. Apparatus as in claim 1 including connecting ducts extending between the top and bottom headers, said connecting ducts being located, adjacent to the ends of said inner vessel and said outer vessel.

5. Apparatus as in claim 1 wherein said heating element in the second reservoir is an electrical heating means.

6. Apparatus as in claim 1 wherein said heat exchange channels around the inner vessel are semi-cylindrical tubes welded to the outside of said inner vessel.

7. Apparatus as in claim 1 wherein said bottom header is a semi-cylindrical tube welded to the outside of said inner vessel.

8. Apparatus as in claim 1 wherein said top header is a semi-cylindrical tube welded to the outside of said inner vessel.

* * * * *